May 12, 1964  K. J. MILLER ETAL  3,132,617
CONTOUR WELDING APPARATUS
Filed Sept. 29, 1958  8 Sheets-Sheet 2
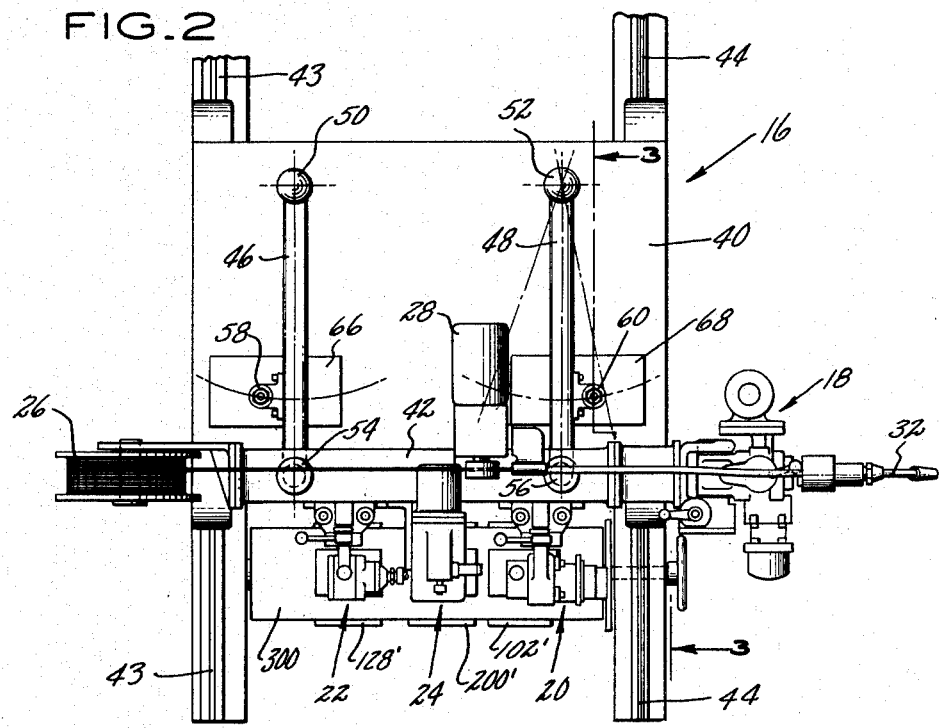
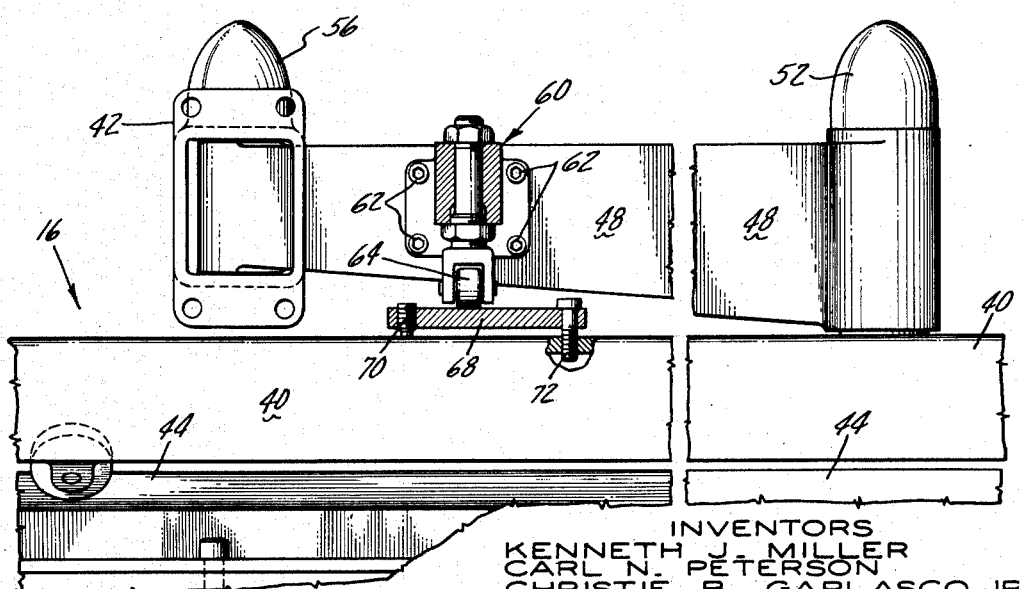
INVENTORS
KENNETH J. MILLER
CARL N. PETERSON
CHRISTIE B. GARLASCO, JR.
BY Vernon F. Hauschild
ATTORNEY

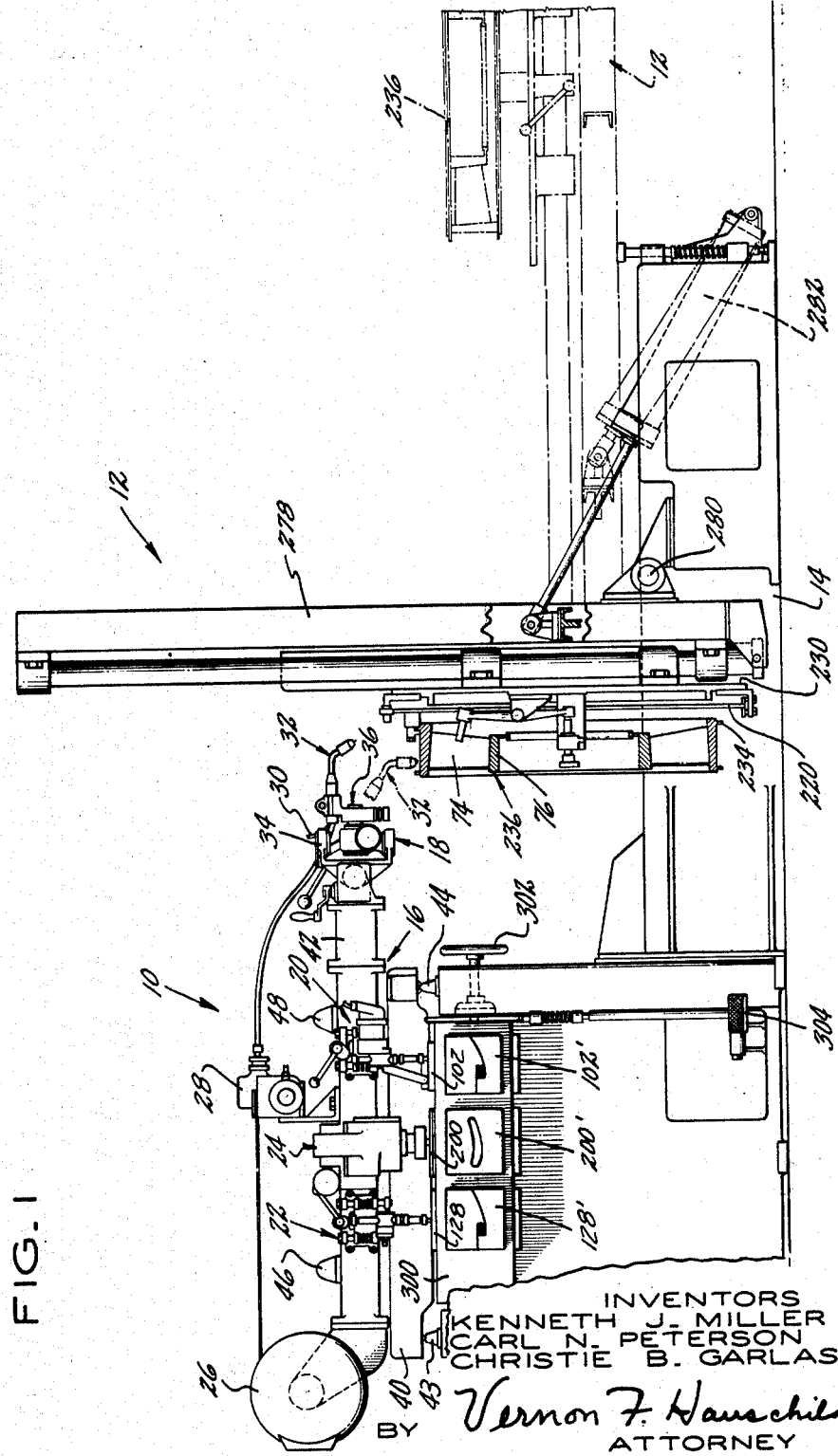

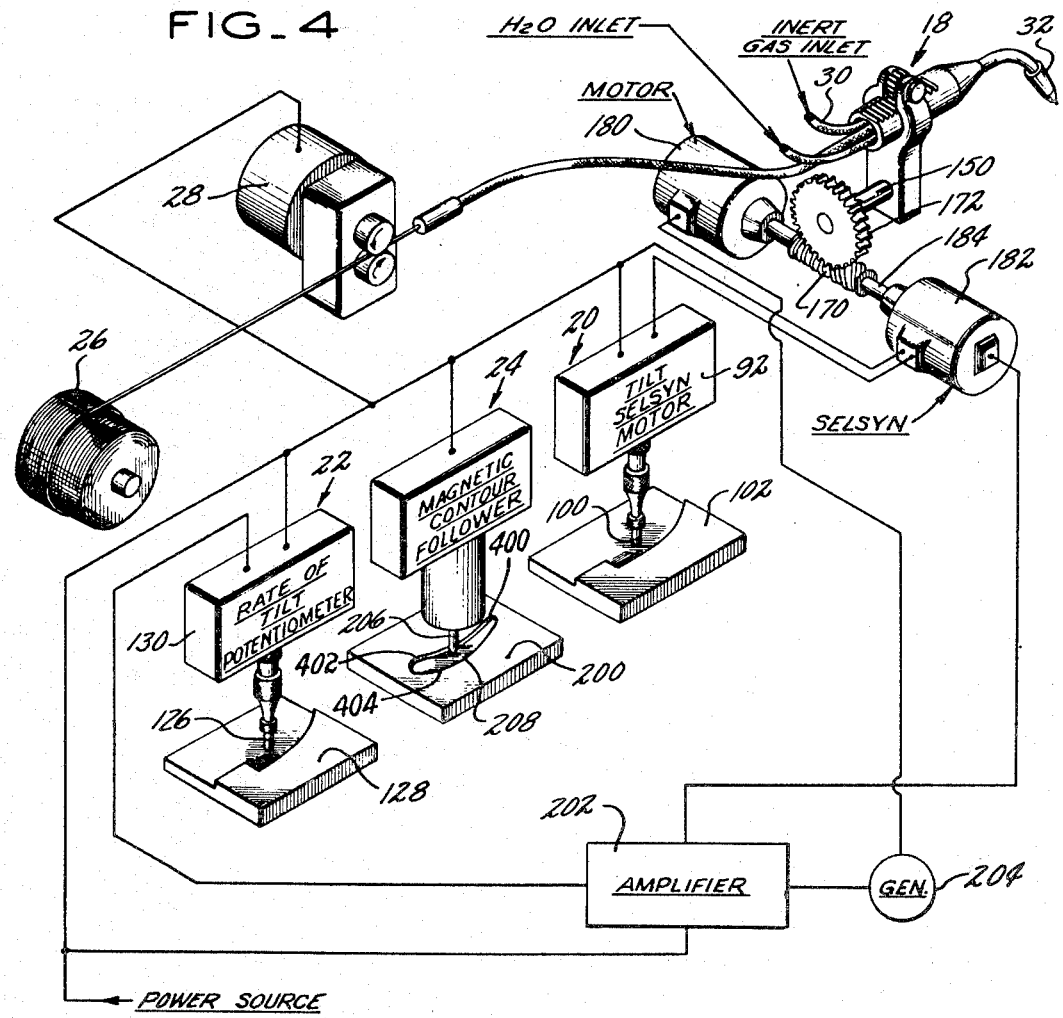

INVENTORS
KENNETH J. MILLER
CARL N. PETERSON
CHRISTIE B. GARLASCO, JR.
BY Vernon F. Hauschild
ATTORNEY

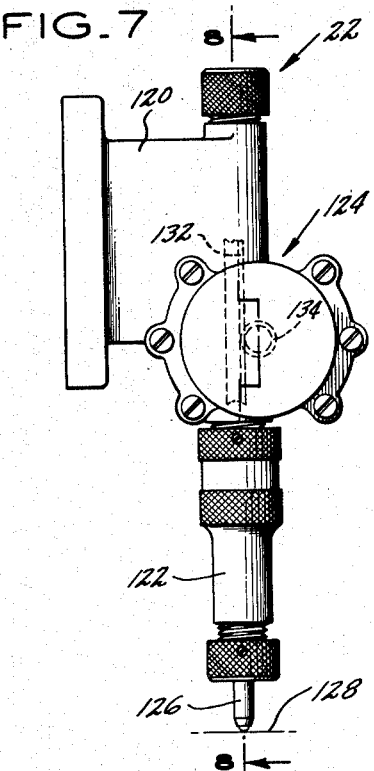
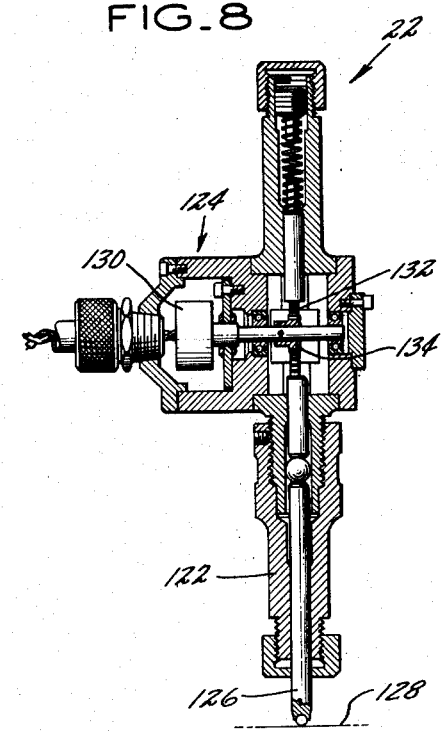
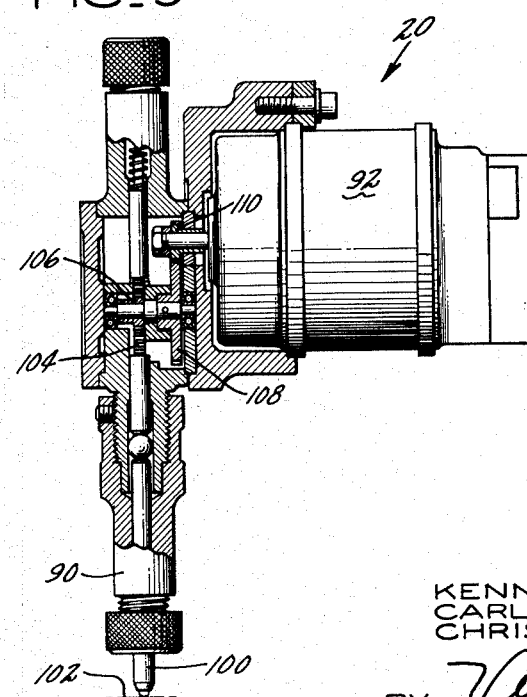

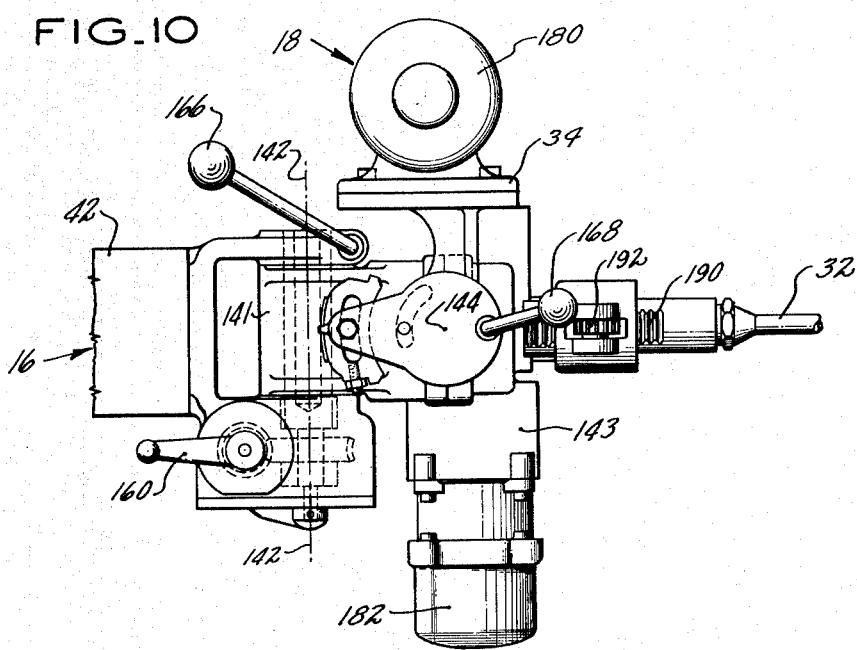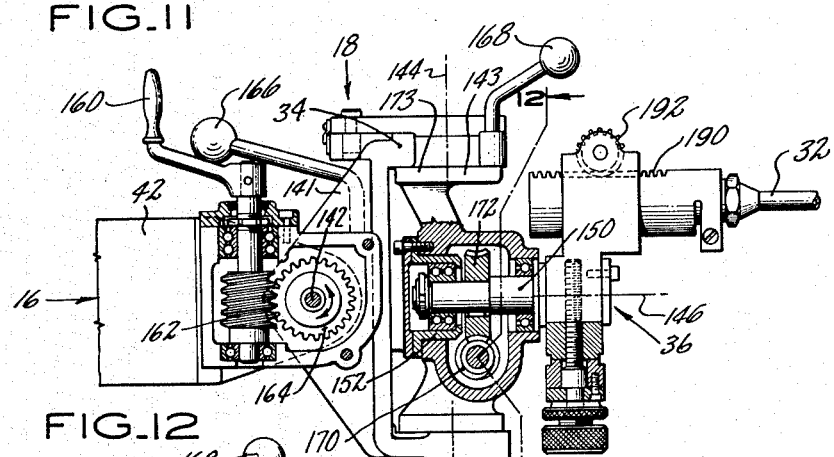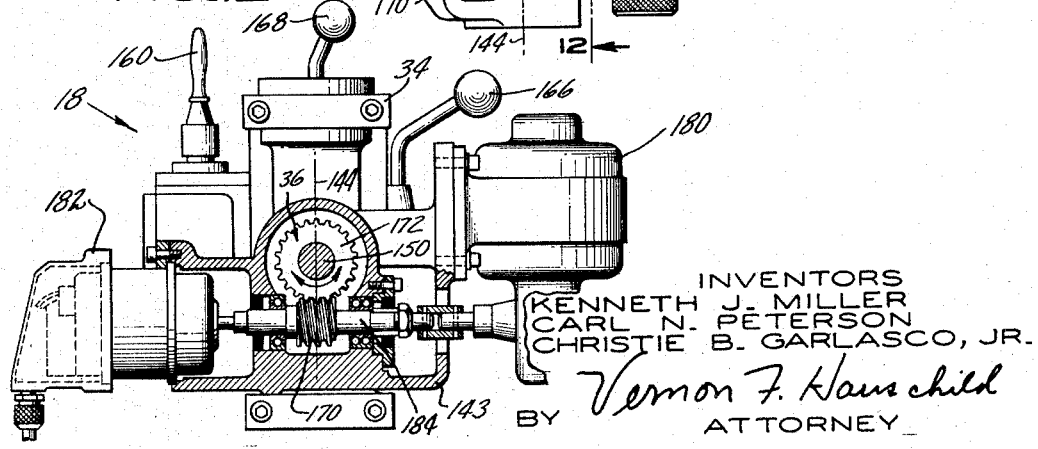

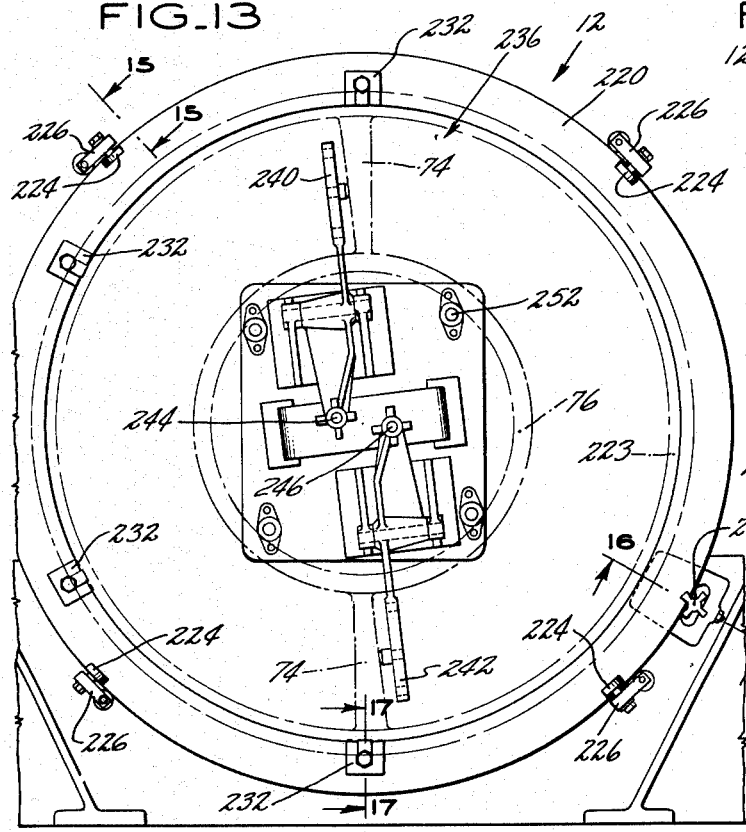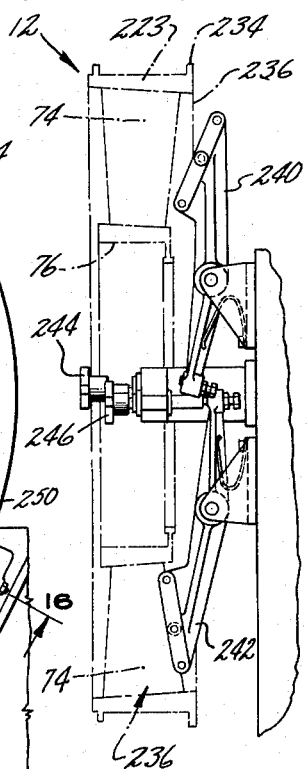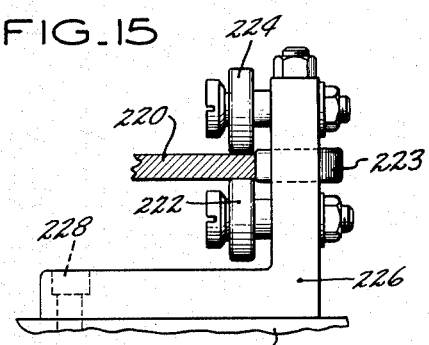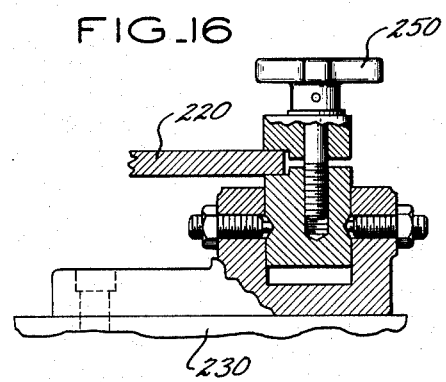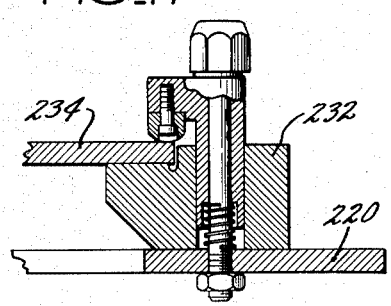

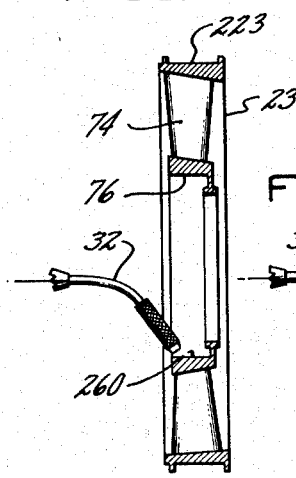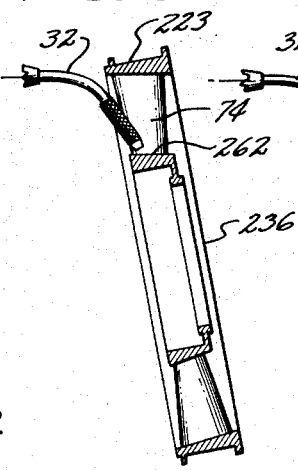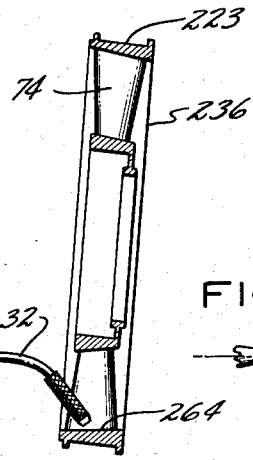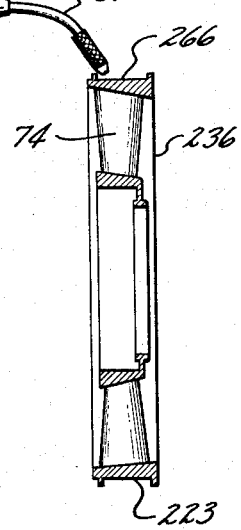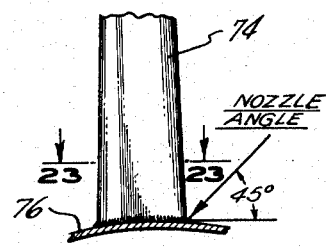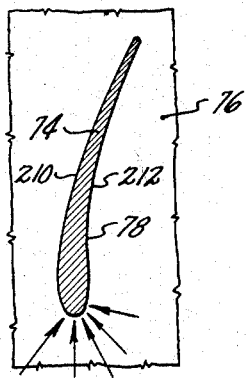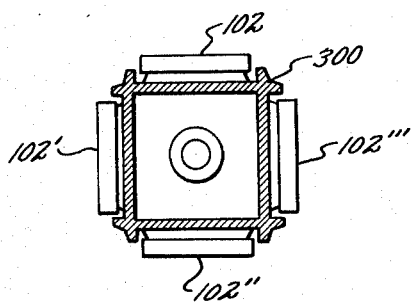

United States Patent Office 3,132,617
Patented May 12, 1964

3,132,617
CONTOUR WELDING APPARATUS
Kenneth J. Miller, Fullerton, Calif., and Carl N. Peterson, Middletown, and Christie B. Garlasco, Jr., Glastonbury, Conn., assignors to United Aircraft Corporation, East Hartford, Conn., a corporation of Delaware
Filed Sept. 29, 1958, Ser. No. 764,053
11 Claims. (Cl. 113—134)

This invention relates to contour welding apparatus and more particularly to welding apparatus which welds together work pieces which intersect to form a junction of irregularly shaped contour of substantially perpendicular cross section.

It is an object of this invention to teach contour welding apparatus which automatically regulates the degree of tilt or angularity of the movable welding head with respect to the fixed work piece junction being welded, preferably so that the work piece junction is bisected by the welding head angle.

It is a further object of this invention to teach contour welding apparatus which further regulates the rate-of-change of the tilt or the angularity of the welding head with respect to the work piece junction to insure welding uniformity.

It is still a further object of this invention to teach welding head tilting means which comprises means to pivotally connect the welding head or torch to a planar type mechanism through a universal joint. Electro-mechanical drive means are provided to cause the welding head or torch to pivot about its connection to the universal joint in a fashion dictated by cam or template contouring which actuates the electro-mechanical drive means to pivot or tilt the welding head or torch.

It is still a further object of this invention to teach manually operated work piece support means which coacts with the contour welding apparatus to position the work piece unit in optimum position with respect to the welding apparatus and which is capable of moving the work piece unit vertically and angularly with respect to the welding apparatus and which may be brought to a reclining position to facilitate work piece unit loading and unloading.

Other objects and advantages will be apparent from the specification and claims, and from the accompanying drawings which illustrate an embodiment of the invention.

FIG. 1 is a side elevation view of our contour welding apparatus and the work piece unit holding fixture.

FIG. 2 is a top plan view of the contour welding apparatus shown in FIG. 1.

FIG. 3 is an enlarged side view of one of the pivotal arms, part of which is shown in vertical section, as taken along line 3—3 of FIG. 2.

FIG. 4 is a schematic diagram of our contour welding apparatus illustrating some important electrical and mechanical features thereof.

FIG. 7 is an enlarged side view of the welding head rate-of-tilt or rate-of-angularity change control shown in FIG. 1.

FIG. 8 is a vertical cross-sectional view taken along line 8—8 of FIG. 7.

FIG. 9 is a partial vertical cross-sectional view taken along line 9—9 of FIG. 5.

FIG. 10 is a top plan view of the welding head unit attached to the welding head support means or planer.

FIG. 11 is a side view, partially broken away, of the welding head unit shown in FIG. 10 and illustrating the three pivotal axes which connect the welding head or torch per se to the welding head support means or planer.

FIG. 12 is a view taken along line 12—12 of FIG. 11.

FIG. 13 is an enlarged front view of the work piece holding fixture or means shown in FIG. 1.

FIG. 14 is a partial side view of the work locating and supporting means shown in FIG. 13.

FIG. 15 is an enlarged partial cross-sectional view taken along line 15—15 of FIG. 13.

FIG. 16 is an enlarged cross-sectional view taken along line 16—16 of FIG. 13.

FIG. 17 is an enlarged cross-sectional view taken along line 17—17 of FIG. 13.

FIGS. 18, 19, 20 and 21 are schematic representations of a typical work piece and a typical welding head or torch showing the series of relationships which must exist between the welding torch and the work piece junctions and illustrating the sequence followed in performing the complete welding operation.

FIG. 22 is a partial view showing a typical work piece intersecting to form a substantially planar junction of perpendicular cross section and indicating the preferred welding head angularity or tilt angle with respect to the junction.

FIG. 23 is a sectional view taken along line 23—23 of FIG. 2 to illustrate the work piece area where the welding head tilt or angularity rate-of-change is important.

FIG. 24 is an enlarged vertical cross-sectional view of the rotatable cam or template drum shown in FIG. 1.

Figure 5:
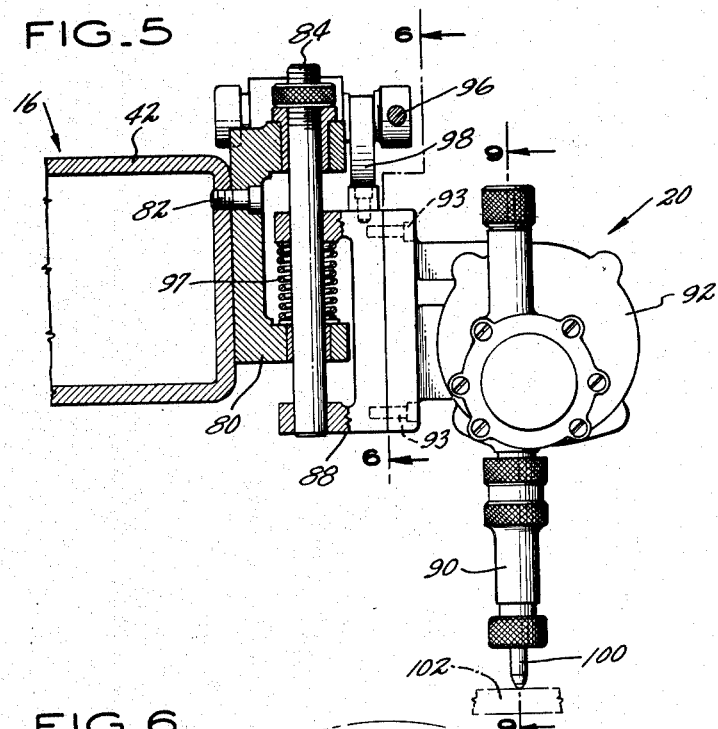
FIG. 5 is a partial sectional view of the welding head tilt or angularity control mechanism attached to the welding head support means.

Referring to FIG. 1 we see our contour welding apparatus 10 shown in conjunction with work piece unit supporting and indexing fixture 12 which may be manually operated, both of which may be located upon a single bed plate 14 with track or guide provision (not shown) to permit manually operated work piece support and indexing fixture 12 to be moved toward and away from contour and welding apparatus 10. Work piece support and indexing fixture 12 will be described in greater particularity hereinafter.

Contour welding apparatus 10 comprises welding head support means 16 which rest upon bed plate 14 so as to be any desired height. Welding head support means or carriage 16 supports and carries welding head unit 18, welding head tilt or angularity control 20, welding head angularity or tilt rate-of-change control 22, welding head planar motion control 24, welding wire reel 26, welding wire feed control 28 and inert gas inlet 30. The welding wire reel 26 and control 28 may be of any convenient type, for instance, of the type taught in U.S. Patent No. 2,753,425. Welding head unit 18 comprises welding head or torch 32, universal joint means 34 which connect to welding torch support means or planer 16 and pivot means 36 which pivotally connects welding head or torch 32 to universal joint mechanism 34 so that welding head 32 may be moved to any position or to any angle with respect to welding head support means 16, as described more fully hereinafter. Tilt control 20, tilt rate-of-change control 22 and welding head planar motion control 24 will be described in greater particularity hereinafter.

Referring to FIGS. 2 and 3 we see further details illustrative of the operation of the welding head support means 16. In FIG. 2 we see that welding head support means 16 comprises plate member 40 which rolls or reciprocates on planar tracks 43 and 44 of bed plate 14 (FIG. 1) so that plate member 40 is capable of back and forth or reciprocal motion in a single plane, preferably in a horizontal plane. Plate member 40 serves to carry cross head member 42 which in turn carries control units 20, 22 and 24 and welding head unit 18. Pivotal arms 46 and 48 are pivotally attached to plate member 40 at pivot points 50 and 52, respectively, and pivotally attach to cross head member 42 at pivot points 54 and 56, respectively. Due to the contouring of arms 46 and 48, as best shown in FIG. 3, pivot points 54 and 56 and hence cross head member 42 are held suspended above plate member 40 and bed plate 14 (FIG. 1). Cross head member 42 is accordingly free to pivot on arms 46 and 48 about pivot points 50 and 52 and also to move with plate member 40 so that welding head support member 16 is capable of moving cross head 42 and hence welding head unit 18 freely in a single and preferably horizontal plane. To relieve the load on pivot arms 46 and 48, roller units 58 and 60 are attached by any convenient means such as bolts 62 (see FIG. 3) to arms 46 and 48 and carry a roller such as 64 which rolls in support fashion against plates 66 and 68, which are adjustably attached to plate member 40 by any convenient means such as the bolt members 70 and 72 shown in FIG. 3. The function of welding head support means 16 in moving welding head unit 18 freely in a single plane is of particular importance since the contour welding apparatus taught herein is intended especially for use in welding together work pieces, such as the airfoil plate 74 and shroud 76 (FIG. 23), which intersect to form an irregularly shaped planar junction such as 78 (FIG. 23), which junction is of substantially perpendicular cross section as shown in FIG. 22.

Figure 6:
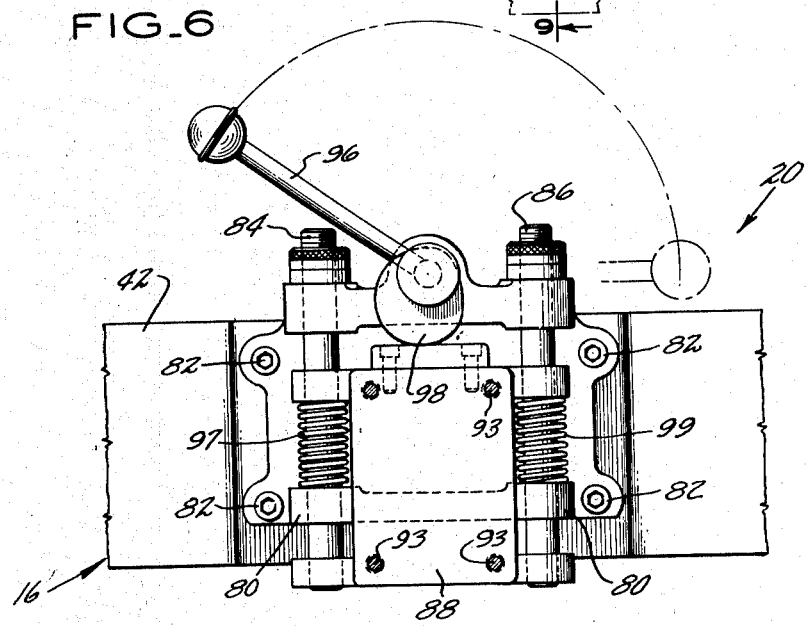
FIG. 6 is a front view of a portion of the mounting bracket taken along line 6—6 of FIG. 5.

It is an important teaching of our invention to provide contour welding apparatus which will cause the welding torch unit 18 to follow the planar junction of perpendicular cross section such as 78 formed by the intersecting work pieces and, further, to regulate the tilt or angularity of the welding head with respect to the junction so that it substantially bisects the perpendicular junction so that the weld head deposits equally on the surface of each of the work pieces 74 and 76 and, further, to control the rate-of-change of welding head tilt or angularity with respect to the work piece junction to insure a uniform weld. The welding head tilt regulation and tilt rate-of-change regulation functions will be described in greater particularity hereinafter, but the mechanism described above illustrates the fashion in which welding head unit 18 may be moved by welding head support means 16 freely within a single plane. By way of mechanical construction of welding head tilt or angularity control 20, consider FIGS. 5, 6 and 9. Frame 80 is attached to cross head member 42 of welding head support means 16 in any convenient means such as by bolts 82 and carries vertically extending pins 84 and 86. Movable frame 88 is mounted to move along pins 84 and 86. Plunger unit 90 and selsyn motor 92 are attached to frame 88 by bolts 93 and hence move therewith. Lever 96 causes cam 98 to rotate and bear against movable frame 88 to overcome springs 97 and 99 and depress movable frame 88, plunger unit 90 and selsyn motor 92 vertically downwardly so that plunger tip 100 will bear against the contoured surface of the welding head tilt or angularity control template or cam 102. While welding head angularity control 20, welding head planar motion control 24 and welding head tilt rate-of-change control 22 are carried by and move with cross head member 42 of planar carriage 16, templates 102 and 128 and contour follower are horizontally positioned on template drum 300 which is attached to bed plate 14 and is stationary during the welding operation. With plunger 100 in contact with cam or template 102, as the contour of template 102 changes, plunger 100 is caused to move in a vertical direction. As best shown in FIG. 9, since plunger 100 carries rack member 104 which engages pinion member 106, the vertical movement of plunger 100 causes the rotation of pinion gear 106. Since pinion gear 106 is connected to the rotor (not shown) of selsyn motor 92 through gears 108 and 110, the vertical motion of plunger 100, through the coaction of rack 104 and gears 106, 108 and 110 cause the rotor of selsyn motor 92 to rotate an amount proportional to plunger motion, which is in turn governed by the contouring of tilt cam 102. Since the surface of welding head tilt control cam 102 is contoured to provide desired welding head tilt throughout the full contour of a particular welding piece junction, such as 78 of FIG. 23, the linear motion imparted to plunger 100 and rack 104 and the rotary motion imparted to the rotor of selsyn motor 92 through gears 106, 108 and 110 are proportional to the dictates of cam 102 and, hence, selsyn motor 92 transmits a tilt signal proportional to the contours of tilt control cam 102. It will be seen when considering FIG. 4 how the mechanism just described permits welding head tilt or angularity control 20 to coact with the remainder of our contour welding apparatus to perform the desired welding head tilt controlling function.

By way of mechanical construction of welding head rate-of-tilt or angularity change control 22, consider FIGS. 7 and 8. Movable support member 120 is vertically slideably positioned with respect to cross head member 42 of welding head support means 16 through members such as 80, 84 and 88 of FIG. 5. Plunger unit 122 and potentiometer unit 124 are attached to movable frame member 120. By means of a cam and lever unit such as is shown at 98 and 96 of FIG. 6, movable frame member 120′ is caused to move vertically downwardly so that plunger 126 bears against the surface of welding head angularity or tilt rate-of-change cam 128. As plunger 126 moves vertically, it imparts a signal to potentiometer 130 by causing it to rotate due to the coaction of rack 132 and pinion 134 in the same fashion as described in connection with FIG. 9. Since the surface of welding head tilt or angularity rate-of-change template or cam 128 is contoured as required for a particular work piece junction, for example, 78 of FIG. 23, the linear motion imparted to plunger 126 and the rotary motion imparted to potentiometer 130 establishes a rate-of-tilt signal proportional to the dictates of cam 128.

By way of mechanical construction of welding head unit 18, consider FIGS. 10, 11 and 12. Welding head unit 18 is connected to cross head member 42 of welding head support means 16 and very broadly comprises a universal joint member 34 comprising frame members 141 and 143. Frame 141 pivotally attaches to cross head member 42 about pivot axis 142. Frame member 143 is pivotally attached to frame member 141 about pivotal axis 144 which is perpendicular to pivotal axis 142. Welding head or torch 32 is pivotally attached to frame 143 of universal joint member 140 along pivotal axis 146 since welding head or torch 32 is connected to shaft 150 which is received pivotally for rotation in bearing support unit 152 of frame member 143. In view of the above, it will be seen that welding head or torch 32 is pivotal with respect to cross head 42 of welding head support means 16 along three separate pivotal axes, namely, 142, 144 and 146 so that it will be obvious that welding head or torch 32 can be placed in any position and at any angle with respect to support means 16.

Manually operated crank 160 causes gears 162 and 164 to coact and cause welding head unit 18 to be manually pivoted about axis 142 and manually operated lever 166 may be used to lock the position of frame 141 with respect to cross head 42. The release of manually operated lever 168 permits the manual rotation of frame 143 and welding head or torch 32 about frame 141 along pivotal axes 144. Lever 168 serves to lock members 141 and 143 in relative position. Welding head or torch 32 may be caused to pivot automatically about frame member 143 along axis 146 when gears 170 and 172 are caused to coact, thereby causing shaft 150 to rotate with respect to frame member 143. Gear 170 is caused to rotate by the action of electric motor 180 which, in a fashion to be described in connection with FIG. 4, receives an electrical impulse from selsyn unit 182. Electric motor 180 and selsyn unit 182 are both attached to frame member 143 and are connected to shaft 184, which carries gear 170.

It will therefore be seen that torch 32 may be caused to pivot about axes 142 and 144 manually and about axis 146 automatically.

Rack 190 and pinion 192 permit adjustment of welding head or torch 32 with respect to frame member 143.

FIG. 4 is a schematic representation of our contour welding apparatus and illustrates how welding head planar motion control 24 coacts with welding head support means 16 and work piece junction contour cam 200 to cause welding head unit 18 to follow the contour of the work piece junction, and further illustrates how welding head tilt control 20 and welding head rate-of-change tilt control 22 coact with cams 102 and 128, respectively, and motor 180, selsyn unit 182, amplifier 202 and electric generator 204 to cause welding head 32 to maintain the proper tilt or angle with respect to the work piece junction and to control the rate-of-change of tilt or welding head 32.

Control 24, which is shown in FIG. 1 to be attached to horizontally movable cross head 42, contains an electric motor (not shown) which when energized by the power source indicated in FIG. 4 causes magnetic and knurled cylindrical pin 206 to rotate. The magnetic attraction between magnetic pin 206 and horizontal template 200 causes pin 206 and hence control 24, support means 16 and welding head 32 to move in planar fashion, preferably horizontally, and follow the contour of track 208 of template 200. Track 208 is machined so that welding head 32 will follow precisely the planar contour of a particular welding piece junction, such as 78 of FIG. 23.

With respect to the tilt or angularity of welding head 32 with respect to the work piece junction, plunger 100 of control 20 bears against the contoured surface of template 102 and is caused to translate vertically as previously described and, in turn, causes the rotor of selsyn motor 92 to rotate proportionally to the vertical translation of plunger 100. Since selsyn motor 92 is electrically connected to selsyn unit 182, as shown in FIG. 4, an electric tilt signal, preferably phase error, is transmitted from selsyn motor 92 to selsyn unit 182. Since selsyn unit 182 is attached to electric motor 180 through shaft 184, selsyn unit 182 is unable to rotate shaft 184 due to the inertia of motor 180 but sends its signal to amplifier 202 from whence, in amplified form but still proportional to the dictates of cam 102, the tilt signal goes to generator 204 which in turn drives electric motor 180 and hence coacting gears 170 and 172 and selsyn unit 182 a sufficient amount to eliminate the tilt signal sent to selsyn unit 182 by selsyn motor 92. Should electric motor 180 drive selsyn 182 beyond the error eliminating position so that an opposite error is set up therein, this opposite error will be transmitted to motor 180 through amplifier 202 and generator 204 and causes motor 180 to rotate selsyn unit 182 back to the error eliminating position.

Since the coaction of gears 170 and 172 causes welding head 32 to pivot about axis 146 of shaft 150, it will be seen that the action of control 20, motor 180, selsyn 182, amplifier 202 and generator 204, just described, will cause welding head 32 to vary its tilt or angularity with respect to the work piece junction, such as 78 of FIG. 23.

Referring to FIGS. 22 and 23 it will be noted that when welding head 32 is performing its welding operation along convex surface 210, the welding head 32 will be directed so as to substantially bisect the right-angled work piece junction and when welding concave surface 212, welding head 32 will be positioned 90° from this position. It will be obvious that when passing through the region of the leading edge of the contoured junction, indicated by arrows in FIG. 23, a substantial degree of welding head tilt or angularity change is required within a very short space of time to insure weld uniformity and hence rate-of-change tilt control 22 is provided to insure a sufficiently rapid tilt change to welding head 32 for these sharply contoured areas of the work piece junction. This arrangement is shown schematically in FIG. 4 and, as previously described, when plunger 126 is caused to translate vertically by the contouring of cam 128, it causes a potentiometer 130 to rotate an amount proportional to the dictates of cam 128. The rotation of potentiometer 130 causes a rate-of-tilt signal proportional to the dictates of cam 128 to be sent to motor 180 through amplifier 202 and generator 204, thereby supplying an added signal to motor 180 beyond the tilt signal received thereby from control 20 and this added signal causes motor 180 and hence welding head 32 to change tilt or angularity with respect to the work piece junction at a different rate.

Referring to FIG. 13 we see manually operated work piece indexing and support structure 12 supporting work piece unit 236, which for purposes of illustration is shown to be a stator assembly comprising a plurality of vanes 74 extending between inner and outer shroud rings 76 and 223, to which the vanes 74 are to be joined by welding. Structure 12 comprises an outer ring 220 which is rotatably mounted between rollers such as 222 and 224 of FIG. 15 which are mounted on brackets 226. Brackets 226 are attached by any convenient means such as bolts 228 to stationary frame 230 of support structure 12. A plurality of clamp-type attachment members 232, shown enlarged in FIG. 17, connect flange 234 of work piece unit 236 to rotatable ring 220. In this fashion, work piece unit 236 is rotatably attached to support fixture 12. Indexing arms 240 and 242 project from fixture 12 and are positionable to a proper index position whereby work piece unit 236 may be indexed to proper position by rotating same until work piece 74 abuts either of indexing members 240 or 242. Plunger mechanisms 244 and 246 may be used to manually bring indexing arms 240 and 242, respectively, into and out of operating position. Knob operated brake unit 250 serves to fix ring 220 and hence work piece unit 236 in position after being indexed as just described. FIG. 14 shows that indexing members 240 and 242 may be actuated independently of one another and, since work piece unit 236 assumes several angular positions during the welding sequence, more than one indexing unit is needed. Plunger members such as 252 serve to ground the unit through fixture 12 and bed plate 14 when an electric welding operation is to be performed.

With respect to the various angles assumed by work piece unit 236, reference will be made to FIGS. 18–21. It is essential that our work piece junction to be welded be substantially planar and preferably horizontal because welding head or torch 32 will be moving in planar fashion. It is therefore necessary when welds are to be made on a given work piece 236 having surfaces lying at various angles relative to one another, such as the welds which will be made along surface 260 of FIG. 18, surface 262 of FIG. 19, surface 264 of FIG. 20 and surface 266 of FIG. 21, that the work piece unit 236 be tiltable to the several positions shown in FIGS. 18–21. This may be accomplished, as best shown in FIG. 1, by manually positioning stationary member 230 of fixture 12 on a hydraulic lift arrangement 278 so that work piece unit 236 may be elevated to any desired position when fixture 12 is in its solid line FIG. 1 position. Hydraulic lift member 278 is pivotally attached to bed plate 14 about pivot point 280 and is caused to pivot thereabout by hydraulic cylinder-piston actuating unit 282. Actuating unit 282 and fixture 12 are so constructed that hydraulic lift member 278 may be moved between a substantially horizontal position shown in phantom in FIG. 1, which facilitates loading and unloading of the work piece unit and to the substantially vertical position shown in solid lines in FIG. 1 and, also, to positions several degrees on each side of the vertical to permit work piece unit 236 to assume the various positions shown in FIGS. 18–21. In view of the above-described construction of FIG. 1, work piece unit 236 may be elevated to present the work piece junction to be welded to welding torch 32 at the desired height and to tilt work piece unit 236 so that the junction is presented so as to be substantially planar and parallel to the plane in which welding head 32 will be moving.

As shown in FIGS. 1 and 24, templates 102, 128 and 200 are mounted on template drum 300, which is rotatable by the action of wheel 302, once released by foot pedal 304, so as to present differently contoured templates such as 102′, 102″, and 102‴ for use with the various controls 20, 22 and 24 of contour welding apparatus 10 and thereby add flexibility to the system permitting the welding of the indicated surfaces 260, 262, 264 and 266 in FIGS. 18–21 without disturbing the setup of contour welding apparatus 10 or work piece support and indexing fixture 12.

To illustrate the operation of our contour welding apparatus, let us assume that we wish to weld vane 74 to shroud 76 along surface 262 of FIG. 19. The work piece 236 will be manually attached to indexing fixture 12 as best shown in phantom in FIG. 1. By means of hydraulic cylinder 282, the indexing fixture 12 will be raised to a position in which surface 262 is substantially horizontal and indexing fixture 12 will be slid along the tracks of bed plate 14 until the tip of welding torch 32 is in close proximity to surface 262. With the magnetic follower 206 of planar motion control 24 positioned at a selected station such as 400 (FIG. 4) near the trailing edge of the concave surface of the vane-shroud junction to be welded, due to the selected positioning of templets 102 and 128 as well as cam 200 on templet drum 300 and the selected positioning of tilt control 20, rate-of-tilt control 22 and magnetic contour follower 24 on crosshead member 42 of weld head support means 16, plungers 126, 206, and 100 of controls 22, 24 and 20, respectively, will always assume corresponding positions on templet 28, cam 200 and templet 102, respectively. Accordingly, controls 20, 22 and 24 are all now positioned in a position corresponding to position 400 on cam 200. With controls 20, 22 and 24 so positioned, the operator then manually positions welding torch 32, by rotating it about axes 142, 144 and 146 in the fashion previously described to bring the tip of weld torch 32 to a position corresponding to position 400 at the vane-shroud junction of work piece 236, which junction is the junction to be welded. In addition to so positioning the tip of torch 32 the operator also manually adjusts the tilt of the torch with respect to vane 74 and shroud 76 such that the torch substantially bisects the angle defined by the vane and shroud. When electrical power is provided to magnetic contour follower control 24, the cross-head member 42 of planar support means 16 carries controls 20, 22 and 24 and welding head unit 18 through the contour of cam 208, which contour is identical with the contour of the vane 74-shroud 76 junction to be welded. Knurled follower 206 first proceeds from station 400 forwardly toward the leading edge of cam recess 208 along its concave side 402 (FIG. 4) and then passes rearwardly or toward the trailing edge of cam recess 208 along its convex side 404, the coaction of plungers 100 and 126 with templets 102 and 128, respectively, cause the weld torch 32 to change in angle as it proceeds throughout the contour of cam recess 208 such that it continually substantially bisects the planar junction defined by the vane 74 and shroud 76. Preferably, station 400 of FIG. 4 is slightly forward of the trailing edge of airfoil shaped recess 208 such that the weld commences forward of the trailing edge and the operation of the welding apparatus is stopped before reaching the trailing edge on its return travel along the opposite side 404 of the airfoil contour 208. This is to prevent damage to the frail trailing edge due to the heat of welding. The weld void left at the trailing edge may be filled in as desired.

It is to be understood that the invention is not limited to the specific embodiment herein illustrated and described but may be used in other ways without departure from its spirit as defined by the following claims.

We claim:

1. Contour welding apparatus including first means to cause a welding head to follow the contour of the cross-sectional junction formed between two pieces to be joined, and second means connected to and responsive to said first means to regulate the angularity of the welding head to substantially bisect the junction between the two pieces, and third means connected to and responsive to said first means to regulate the rate of change of angularity of the welding head relative to the work pieces.

2. Contour welding apparatus including first means to cause a welding head to follow the contour of the substantially right angle junction formed between two pieces to be joined, second means connected to and responsive to said first means to regulate the angularity of the welding head to substantially bisect the junction between the two pieces, and third means connected to and responsive to said first means to regulate the rate of change of angularity of the welding head relative to the two pieces.

3. Contour welding apparatus adapted to weld together work pieces which define an included angle and which join in a junction which lies in substantially a single plane including a welding head, carrying means, universal joint means connected to said carrying means and pivot means joining said welding head to said universal joint means so that said welding head is movable to and positionable in a select position and angle with respect to said carrying means and the junction between the work pieces, means to support said carrying means permitting freedom of motion of said carrying means and hence said welding head in a single plane substantially parallel to said junction, a first template defining the contour of the junction between the work pieces, electro-magnetic means attached to said carrying means and engaging said first template to cause said carrying means and hence said welding head to follow the contour of the junction between the work pieces, a second template defining the desired angularity of said welding head with respect to and throughout the periphery of the junction between the work pieces, electrical synchronizing means connected to said carrying means and said pivot means, and a plunger carried by said carrying means and engaging and actuated by said second template and coacting with said electrical synchronizing means to regulate the angularity of said welding head with respect to the planar junction between the work pieces by causing said welding head to pivot about said pivot means.

4. Contour welding apparatus adapted to weld together work pieces which define an included angle and which join in a junction which lies in substantially a single plane including a welding head, carrying means, universal joint means connected to said carrying means, and pivot means joining said welding head to said universal joint means so that said welding head is movable to and positionable in a selected position and angle with respect to said carrying means and the junction between the work pieces, means to support said carrying means permitting freedom of motion of said carrying means and hence said welding head in a single plane substantially parallel to said junction, welding head actuating means comprising a first template defining the contour of the junction between the work pieces and an electro-magnetic means attached to said carrying means and engaging said first template to cause said carrying means and hence said welding head to follow the contour of the junction between the work pieces, welding head angularity control means comprising a second template defining the desired angularity of said welding head with respect to and throughout the periphery of the junction between the work pieces and an electrical synchronizing means connected to said carrying means and said pivot means, and a plunger carried by said carrying means and engaging and actuated by said second template and coacting with said electrical synchronizing means to regulate the angularity of said welding head with respect to the junction between the work pieces by causing said welding head to pivot about said pivot means, and welding head angularity rate-of-change control means comprising a third template and second electrical means carried by said carrying means and connected to said pivot means, and a plunger carried by said carrying means and engaging and actuated by said third template to energize said second electrical means thereby causing said welding head to pivot about said pivot means at a regulated rate.

5. Contour welding apparatus adapted to weld together work pieces which define an included angle and which join in a substantially horizontally extending junction including a welding head, carrying means, universal joint means connected to said carrying means, pivot means including coacting drive gears joining said welding head to said universal joint means so that said welding head is movable to and positionable in a selected position and angle with respect to said carrying means and the junction between the work pieces, an electric motor and a selsyn unit connected to said drive gears and electrically joined through an electric amplifier and generator, means to support said carrying means permitting freedom of motion of said carrying means and hence said welding head in a horizontally extending plane substantially parallel to said junction, a first template defining the contour of the junction between the work pieces, electromagnetic means attached to said carrying means and engaging said first template to cause said carrying means and hence said welding head to follow the contour of the junction between the work pieces, a second template defining the desired angularity of said welding head with respect to and throughout the periphery of the junction between the work pieces including a selsyn motor with a rotor electrically connected to said selsyn unit, and a plunger carried by said carrying means and engaging and actuated by said second template and coacting with said selsyn motor to rotate the rotor thereof proportional to plunger movement thereby causing said selsyn motor to send a tilt signal of such proportion to said selsyn unit from whence the tilt signal passes to and is amplified by said amplifier and then the tilt signal so amplified passes to the generator which causes said electric motor and selsyn unit to rotate and drive said drive gears to pivot said welding head with respect to the junction between the work pieces an amount proportional to the tilt signal.

6. Contour welding apparatus adapted to weld together work pieces which define an included angle and which join in a substantially horizontally extending junction including a welding head, carrying means, universal joint means connected to said carrying means, pivot means including coacting drive gears joining said welding head to said universal joint means so that said welding head is movable to and positionable in a selected position and angle with respect to said carrying means and the junction between the work pieces, an electric motor and a selsyn unit connected to said drive gears and electrically joined through an electric amplifier and generator, means to support said carrying means permitting freedom of motion of said carrying means and hence said welding head in a horizontally extending plane substantially parallel to said junction, welding head actuating means comprising a first template defining the contour of the junction between the work pieces and an electro-magnetic means attached to said carrying means and engaging said first template to cause said carrying means and hence said welding head to follow the contour of the junction between the work pieces, welding head tilt control means comprising a second template defining the desired angularity of said welding head with respect to and throughout the periphery of the junction between the work pieces including a selsyn motor with a rotor electrically connected to said selsyn unit and further including a plunger carried by said carrying means and engaging and actuated by said second template and coacting with said selsyn motor to rotate the rotor thereof proportional to plunger movement thereby causing said selsyn motor to send a tilt signal of such proportion to said selsyn unit from whence the tilt signal passes to and is amplified by said amplifier and then the tilt signal so amplified passes to the generator which causes said electric motor and selsyn unit to rotate and drive said drive gears to pivot said welding head with respect to the junction between the work pieces an amount proportional to the tilt signal, and welding head tilt rate-of-change control means comprising a third template and second electrical means including a potentiometer carried by said carrying means and connected to said electric motor through said amplifier and generator, and further including a plunger carried by said carrying means and engaging and actuated by said third template to actuate said potentiometer proportional to plunger movement thereby sending a tilt rate-of-change signal proportional thereto to said electric motor through said amplifier and generator to change the rate of rotation of said motor and hence the rate-of-pivot motion of said welding head with respect to said junction between the work pieces.

7. Contour welding apparatus including a bed plate, a welding head adapted to perform a welding operation at the substantially horizontally extending junction of work pieces to be joined by weld, welding head carrying means, means to support said carrying means permitting freedom of motion of said carrying means and hence said welding head in a horizontal plane, means connecting said welding head to said carrying means so that said welding head is movable to a selected position and angle with respect to said carrying means and the junction between the work pieces, means to cause said carrying means and hence said welding head to follow the contour of the junction between the work pieces, and electric means to automatically regulate the angularity of said welding head with respect to the junction between the work pieces, and work piece mounting means mounted on said bed plate and movable thereon toward and away from said welding head carrying means including a hydraulic lift means pivotally attached to said bed plate, further including means to indexably attach the work pieces to said hydraulic lift means for movement therealong, and also including means to pivot said hydraulic lift means between a substantially horizontal position and a position beyond the vertical therefrom and positions therebetween.

8. Contour welding apparatus including first means to cause a welding head to follow a planar contour defined by work pieces intersecting as substantially a right angle, second means connected to and responsive to said first means to automatically regulate the angularity of the welding head relative to the work piece intersections and third means connected to and responsive to said first means to regulate the rate of change of angularity of the welding head relative to the work piece intersection.

9. Contour welding apparatus including a universally moveable welding head, first means to cause a welding head to follow the contour of the substantially right angle junction formed between two pieces to be joined, and second means to automatically regulate the angularity of the welding head to substantially bisect the junction between the two pieces, including an electric motor connected to position said welding head, a template contoured to produce the desired angularity of said welding head, a selsyn motor electrically connected in selsyn fashion to said electric motor and plunger means registering with and following the contour of said template to be moved thereby and connected to actuate said selsyn motor electric motor and welding head in proportion to the contour of said template.

10. Contour welding apparatus including a welding head adapted to perform a welding operation at a right angle junction of work pieces to be joined by weld, welding head carrying means, first means to support said carrying means permitting freedom of motion of said carrying means and hence said welding head in a single plane, second means connecting said welding head to said carrying means so that said welding head is movable to a selected position and angle with respect to said carrying means and the junction between the work pieces, third means connected to and responsive to said first means to cause said carrying means and hence said welding head to follow the contour of the junction between the work pieces, and fourth means connected to and responsive to said first means to automatically regulate the angularity of said welding head with respect to the right angle junction between the work pieces so that said welding head bisects said right angle junction, and fifth means connected to and responsive to said first means to regulate the rate of change of angularity of said welding head.

11. Contour welding apparatus adapted to weld together work pieces which define an included angle and which join in a junction which lies in substantially a single plane including a welding head, a welding head carrying means, first means to support said carrying means permitting freedom of motion of said carrying means and hence said welding head in a single plane substantially parallel to said junction, universal joint means connecting said welding head to said carrying means so that said welding head is movable to and positionable in a selected position and angle with respect to said carrying means and the junction between the work pieces, pivot means joining said welding head to said universal joint means, first automatic means connected to and responsive to said first means to cause said carrying means and hence said welding head to follow the contour of the junction between the work pieces, and second automatic means connected to and responsive to said first means and coacting with said first automatic means to regulate the angularity of said welding head with respect to the junction between the work pieces to substantially bisect said included angle by causing said welding head to pivot about said pivot means.

References Cited in the file of this patent

UNITED STATES PATENTS

| | | |
|---|---|---|
| 1,550,651 | Charter | Aug. 18, 1925 |
| 1,706,842 | Cooper | Mar. 26, 1929 |
| 1,940,331 | Smith | Dec. 19, 1933 |
| 2,271,723 | Trainer | Feb. 2, 1942 |
| 2,288,032 | Smith | June 30, 1942 |
| 2,452,189 | Helmkamp | Oct. 26, 1948 |
| 2,477,169 | Brekelbaum | July 26, 1949 |
| 2,499,938 | Ward | Mar. 7, 1950 |
| 2,596,951 | Carpenter et al. | May 13, 1952 |
| 2,674,160 | Martellotti | Apr. 6, 1954 |
| 2,717,569 | Osterman et al. | Sept. 3, 1955 |
| 2,778,280 | Trofimov | Jan. 22, 1957 |
| 2,800,570 | Murton | July 23, 1957 |
| 2,827,547 | Tiedemann | Mar. 18, 1958 |
| 2,884,242 | Fleming | Apr. 29, 1959 |
| 2,927,992 | Bateman | Mar. 8, 1960 |

FOREIGN PATENTS

| | | |
|---|---|---|
| 596,959 | Great Britain | Jan. 14, 1948 |
| 797,020 | Great Britain | June 25, 1958 |